US012696160B2

(12) United States Patent
Hoshino

(10) Patent No.: US 12,696,160 B2
(45) Date of Patent: Jul. 28, 2026

(54) INFORMATION PROCESSING APPARATUS, INFORMATION PROCESSING METHOD, AND COMPUTER READABLE MEDIUM

(71) Applicant: NEC Corporation, Tokyo (JP)

(72) Inventor: Yoshihiko Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 552 days.

(21) Appl. No.: 18/098,459

(22) Filed: Jan. 18, 2023

(65) Prior Publication Data

US 2023/0284112 A1 Sep. 7, 2023

(30) Foreign Application Priority Data

Mar. 30, 2022 (JP) ................................. 2022-055484

(51) Int. Cl.
*H04W 36/14* (2009.01)
*H04W 76/10* (2018.01)

(52) U.S. Cl.
CPC ........... *H04W 36/14* (2013.01); *H04W 76/10* (2018.02)

(58) Field of Classification Search
CPC .............................. H04W 36/14; H04W 76/10
See application file for complete search history.

(56) References Cited

U.S. PATENT DOCUMENTS

2019/0141618 A1 5/2019 Yin et al.
2020/0336972 A1 10/2020 Yin et al.

2021/0105632 A1* 4/2021 Pazhyannur .......... H04W 60/00
2022/0060883 A1* 2/2022 Zhu ....................... H04W 8/245
2022/0264445 A1 8/2022 Sakai

FOREIGN PATENT DOCUMENTS

| JP | 2019-518395 A | 6/2019 |
| JP | 2021-087101 A | 6/2021 |
| JP | 2021-158453 A | 10/2021 |
| WO | 2008/130106 A1 | 10/2008 |

OTHER PUBLICATIONS

JP Office Action for JP Application No. 2022-055484, mailed on Jun. 17, 2025 with English Translation.

* cited by examiner

*Primary Examiner* — Justin Y Lee

(74) *Attorney, Agent, or Firm* — Sughrue Mion, PLLC

(57) ABSTRACT

To enable a user terminal to appropriately switch a connection between a public network and a non-public network.

There is provided an information processing apparatus including: a receiving unit that receives information indicating that a user terminal, which is located in a base station of a public network and connected to the public network in such a way as to be capable of data communication, is located in a base station of a non-public network; and a control unit that controls, based on contract information of the user terminal, to disconnect data communication in the public network and transmit information for connecting data communication in the non-public network.

7 Claims, 7 Drawing Sheets

501

| USER ID | PRIORITY NON-PUBLIC NETWORK NAME | PRIORITY NON-PUBLIC NETWORK CELL | NECESSITY OF APPROVAL WHEN CONNECTING TO PRIORITY NON-PUBLIC NETWORK | NECESSITY OF APPROVAL WHEN RECONNECTING TO PUBLIC NETWORK |
|---|---|---|---|---|
| USER A | DNN1 | TA1 | NO | NECESSARY |
| USER B | ... | ... | ... | ... |
| ... | ... | ... | ... | ... |

Fig. 5

INFORMATION PROCESSING APPARATUS, INFORMATION PROCESSING METHOD, AND COMPUTER READABLE MEDIUM

INCORPORATION BY REFERENCE

This application is based upon and claims the benefit of priority from Japanese patent application No. 2022-055484, filed on Mar. 30, 2022, the disclosure of which is incorporated herein in its entirety by reference.

TECHNICAL FIELD

The present disclosure relates to an information processing apparatus, an information processing method, a program, and an information processing system.

BACKGROUND ART

In recent years, a technology related to a non-public network (e.g., a local 5G) has attracted attention. The non-public network is, for example, a network that provides a mobile communication service in a limited area such as a school, a factory, or a company (e.g., refer to Patent Literature 1 (Japanese Unexamined Patent Application Publication No. 2021-158453)). The non-public network is also referred to as, for example, a non-public network (NPN), a private network, a local cellular network, or the like.

SUMMARY

However, in a technique described in Patent Literature 1, for example, when a user terminal is connectable to a public network and a non-public network, there is a case where a network to be connected cannot be appropriately switched.

In view of the above problem, an example object of the present disclosure is to provide a technique capable of allowing a user terminal to appropriately switch a connection between a public network and a non-public network.

According to a first example aspect of the present disclosure, there is provided an information processing apparatus including: a receiving unit configured to receive information indicating that a user terminal, which is located in a base station of a public network and connected to the public network in such a way as to be capable of data communication, is located in a base station in a non-public network; and a control unit configured to control, based on contract information of the user terminal, to disconnect data communication in the public network and transmit information for connecting data communication in the non-public network.

According to a second example aspect of the present disclosure, there is provided an information processing method including: receiving information indicating that a user terminal, which is located in a base station of a public network and is connected to the public network in such a way as to be capable of data communication, is located in a base station of a non-public network; and controlling to disconnect data communication in the public network and transmit information for connecting data communication in the non-public network, based on contract information of the user terminal.

Further, according to a third example aspect of the present disclosure, there is provided a program causing a computer to execute processing of: receiving information indicating that a user terminal, which is located in a base station of a public network and connected to the public network in such a way as to be capable of data communication, is located in a base station of a non-public network; and controlling to disconnect data communication in the public network and transmit information for connecting data communication in the non-public network, based on contract information of the user terminal.

Further, according to a fourth example aspect of the present disclosure, there is provided an information processing system including an information processing apparatus and a user terminal, wherein the information processing apparatus includes: a receiving unit configured to receive information indicating that a user terminal, which is located in a base station of a public network and connected to the public network in such a way as to be capable of data communication, is located in a base station of a non-public network; and a control unit configured to control, based on contract information of the user terminal, to disconnect data communication in the public network and transmit information for connecting data communication in the non-public network.

According to an example aspect, it is possible for the user terminal to appropriately switch a connection between the public network and the non-public network.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 5 is a diagram illustrating an example of information stored in a contract DB (database) according to the example embodiment;

EXAMPLE EMBODIMENT

Principles of the present disclosure are described with reference to several example embodiments. It should be understood that these example embodiments are set forth for purposes of illustration only and that those skilled in the art will assist in understanding and practicing the present disclosure without suggesting limitations on the scope of the present disclosure. The disclosure described herein may be implemented in various methods other than those described below.

In the following description and claims, unless otherwise defined, all technical and scientific terms used herein have the same meaning as commonly understood by one of those skilled in the art of technology to which the present disclosure belongs.

Hereinafter, example embodiments of the present disclosure will be described with reference to the drawings.

First Embodiment

<Configuration>

Figure 1:
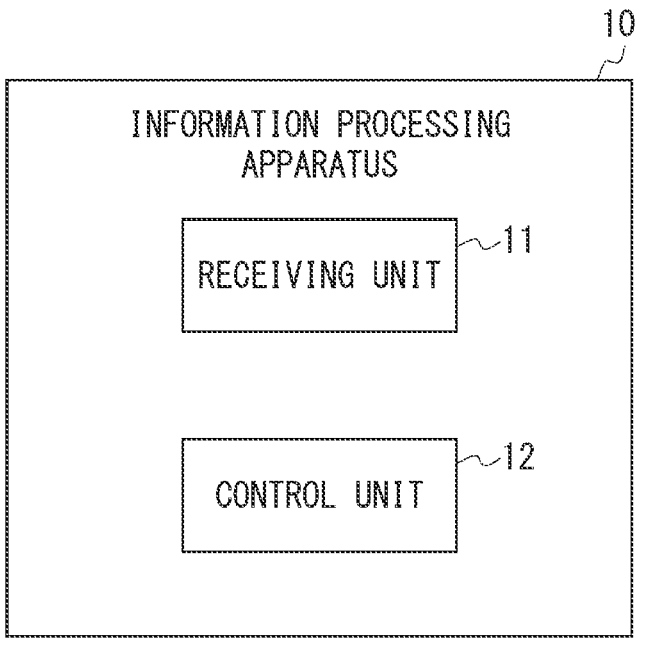
FIG. 1 is a diagram illustrating an example of a configuration of an information processing apparatus according to an example embodiment.

A configuration of an information processing apparatus 10 according to an example embodiment will be described with reference to FIG. 1. FIG. 1 is a diagram illustrating an example of a configuration of the information processing apparatus 10 according to the example embodiment. The information processing apparatus 10 includes a receiving unit 11 and a control unit 12. These units may be achieved by cooperation of one or more programs installed in the information processing apparatus 10 and hardware such as a processor 101 and a memory 102 of the information processing apparatus 10.

The receiving unit 11 receives information indicating that a user terminal 20, which is located in a base station 30A of a public network and connected to the public network in such a way as to be capable of data communication, is located in a base station 30B of a non-public network. Based on contract information of the user terminal 20, the control unit 12 performs control to disconnect data communication in the public network and transmit information for connecting data communication in the non-public network. As a result, the user terminal 20 can appropriately switch a connection between the public network and the non-public network.

Second Embodiment

Next, a configuration of an information processing system 1 according to an example embodiment will be described with reference to FIG. 2.

<System Configuration>

Figure 2:
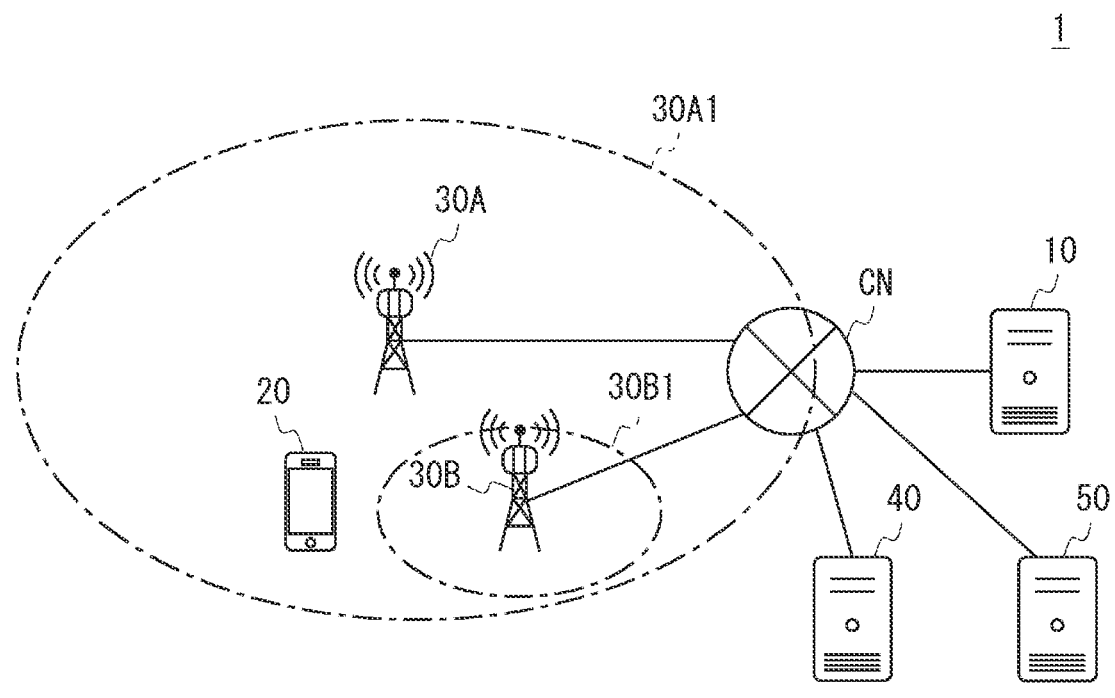
FIG. 2 is a configuration example of an information processing system according to an example embodiment.

FIG. 2 is a diagram illustrating a configuration example of the information processing system 1 according to the example embodiment. In the example of FIG. 2, the information processing system 1 includes an information processing apparatus 10 and a user terminal 20. Further, the information processing system 1 includes a base station 30A and a base station 30B (hereinafter, also simply referred to as a "base station 30" when there is no need to distinguish between them). The information processing system 1 includes a management apparatus 40 and a contract management apparatus 50. Note that the number of the information processing apparatus 10, the user terminal 20, the base station 30, the management apparatus 40, and the contract management apparatus 50 is not limited to the example in FIG. 2.

In the example of FIG. 2, the information processing apparatus 10, the user terminal 20, the base station 30, the management apparatus 40, and the contract management apparatus 50 are communicably connected by at least one of a radio access network (RAN) and a core network CN. Note that the number of the information processing apparatus 10, the user terminal 20, the base station 30, the management apparatus 40, and the contract management apparatus 50 is not limited to the example in FIG. 2.

The radio access network and the core network CN form a mobile communication system. Examples of the mobile communication system may include a fifth-generation mobile communication system (5G), a sixth-generation mobile communication system (6G, Beyond 5G), a fourth-generation mobile communication system (4G), a third-generation mobile communication system (3G), and the like, but a system conforming to an any suitable standard, which is not limited to these, may be used. Further, wireless communication of a mobile communication system may be performed according to any generation of communication protocols now known or developed in the future.

The user terminal 20 is any device having a wireless communication function. Examples of the user terminal 20 (UE: User Equipment) include, but are not limited to, a smart phone, a mobile phone, a tablet terminal, and the like.

A range (coverage) in which the user terminal 20 can receive radio waves from the base station 30 is also referred to as a cell. The base station 30 (BS: Base Station) is a device capable of providing or hosting a cell or coverage in which the user terminal 20 can communicate. Examples of the base station 30 include, but are not limited to, a next generation Node B (gNB), an Evolved Node B (eNodeB or eNB), a Node B (NodeB or NB), and the like.

The base station 30A is a base station of a public network (carrier network) provided by a telecommunications carrier (communication provider, carrier). In the example of FIG. 2, the base station 30A forms a cell 30A1.

The base station 30B is a base station of a non-public network (NPN). In the example of FIG. 2, the base station 30B forms a cell 30B1 having a narrower coverage than the cell 30A1. The non-public network may be, for example, a local 5G (local fifth generation mobile communication system) network. The configuration of the non-public network may be, for example, a configuration of a Public Network Integrated Non-Public Network (PNI-NPN) constructed by sharing at least a part of the function with the public network. Thus, for example, a service in cooperation with the public network can be provided in the non-public network. In this case, for example, a service (e.g., an automatic switching service between a public network and a non-public network or the like) according to contract contents between the telecommunications carrier and a user of the user terminal 20 can be provided in the non-public network.

The information apparatus 10 may be, for example, a node (AMF node) having an Access and Mobility management Function (AMF) function for performing mobility management in a core network. The management apparatus 40 may be a node (UDM node) having a Unified Data Management (UDM) function that manages authentication information and location information in the core network. In this case, the management apparatus 40 may have AUthentication Server Function (AUSF) function, which is an authentication-processing function.

The contract management apparatus 50 may be, for example, a business support system (BSS) of a telecommunications carrier. The contract management apparatus 50 may manage, for example, user (customer) information and contract billing information of each user.

<Hardware Configuration>

Figure 3:
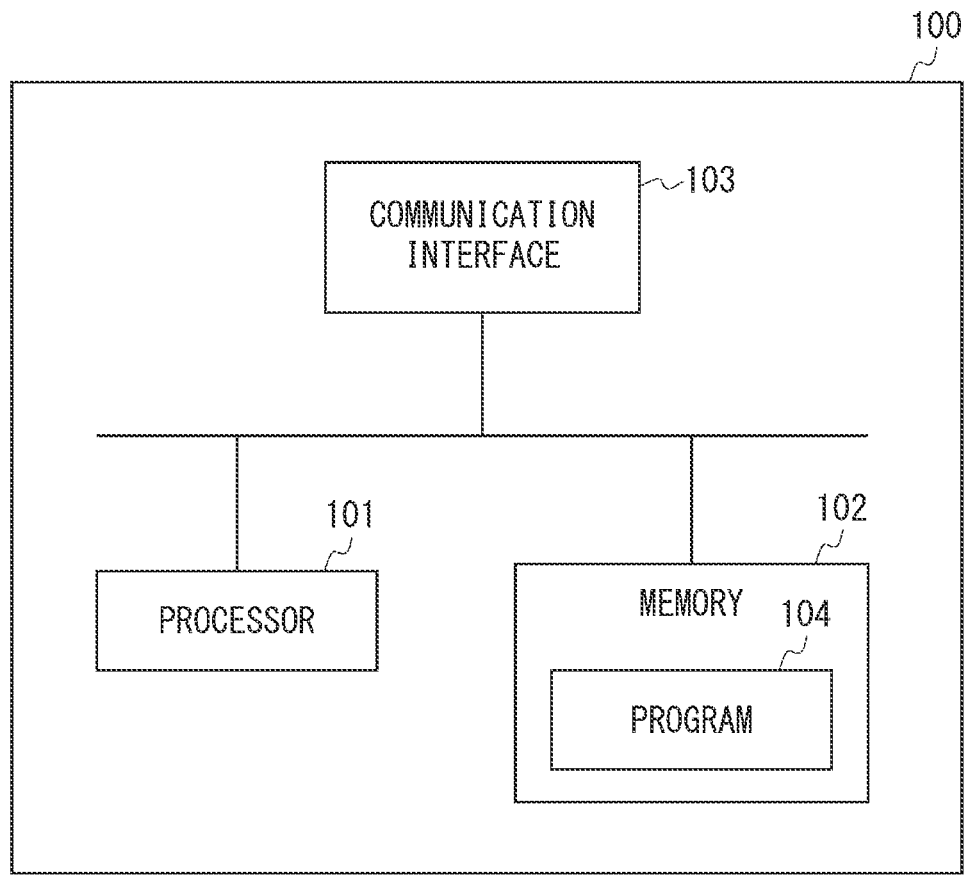
FIG. 3 is a hardware configuration example of an information processing apparatus according to the example embodiment.

FIG. 3 is a diagram illustrating an example of a hardware configuration of the information processing apparatus 10 according to the example embodiment. In the example of FIG. 3, the information processing apparatus 10 (computer 100) includes a processor 101, a memory 102, and a communication interface 103. These units may be connected by a bus or the like. The memory 102 stores at least a part of a program 104. The communication interface 103 includes an interface necessary for communication with other network elements.

When the program 104 is executed by cooperation of the processor 101, the memory 102, and the like, the computer 100 performs at least a part of processing of the example embodiment of the present disclosure. The memory 102 may be of any type suitable for a local technology network. The memory 102 may be, by way of non-limiting example, a non-transitory computer readable storage medium. The memory 102 may also be implemented by using any suitable data storage technology, such as semiconductor-based memory devices, magnetic memory devices and systems, optical memory devices and systems, fixed memory, and removable memory. Although only one memory 102 is illustrated in the computer 100, there may be several physically different memory modules in the computer 100. The processor 101 may be of any type. The processor 101 may include one or more of a general purpose computer, a special purpose computer, a microprocessor, a digital signal processor (DSP), and, as a non-limiting example, a processor based on a multi-core processor architecture. The computer 100 may include a plurality of processors, such as application specific integrated circuit chips, which are temporally dependent on a clock that synchronizes a main processor.

The example embodiments of the present disclosure may be implemented in hardware or dedicated circuit, software, logic, or any combination thereof. Some aspects may be implemented in hardware, while other example aspects may be implemented in firmware or software that may be executed by a controller, microprocessor, or other computing device.

The present disclosure also provides at least one computer program product tangibly stored on a non-transitory computer readable storage medium. The computer program product includes computer-executable instructions, such as instructions contained in a program module, is executed on a device on a real or virtual processor of interest, and executes the process or method of the present disclosure. The program module includes a routine, a program, a library, an object, a class, a component, a data structure, and the like that perform a particular task or implement a particular abstract data type. A function of the program module may be combined or split between the program modules as desired in various example embodiments. The machine-executable instruction of the program module may be executed in a local or distributed device. In a distributed device, program modules can be arranged on both local and remote storage media.

A program code for performing the method of the present disclosure may be written in any combination of one or more programming languages. These program codes are provided to a processor or controller of a general purpose computer, a special purpose computer, or another programmable data processing apparatus. When the program code is executed by a processor or controller, functions/operations in the flowcharts and/or implementing block diagrams are performed. The program code is executed entirely on a machine, partly on the machine, as a stand-alone software package, partly on the machine, partly on a remote machine, or entirely on the remote machine or a server.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires and optical fibers) or a wireless communication line.

<Processing>

<<Processing of Managing Contract Information>>

Figure 4:
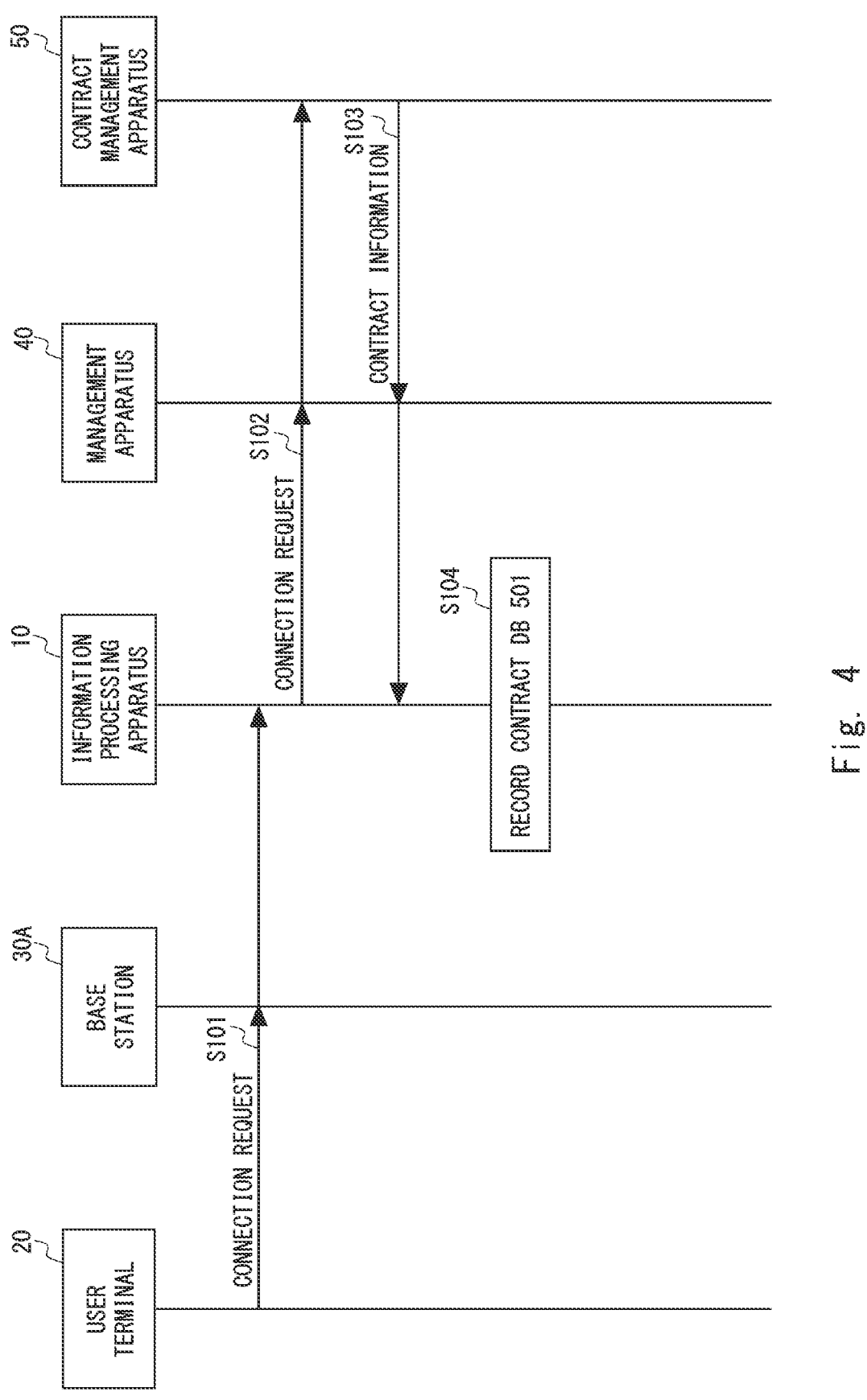
FIG. 4 is a sequence diagram illustrating an example of processing of managing contract information of the information processing system according to the example embodiment.

Next, an example of processing of managing contract information of the information processing system 1 according to the example embodiment will be described with reference to FIGS. 4 and 5. FIG. 4 is a sequence diagram illustrating an example of processing of managing contract information of the information processing system 1 according to the example embodiment. FIG. 5 is a diagram illustrating an example of information stored in a contract DB (database) 501 according to the example embodiment.

In step S101, the user terminal 20 transmits a connection request to the information processing apparatus 10 via the base station 30A. Herein, for example, the user terminal 20 may transmit the connection request when a Subscriber Identity Module (SIM) card of a telecommunications carrier to which a user has contracted (subscribed) is inserted. In addition, the user terminal 20 may transmit the connection request when profile data are downloaded to an embedded SIM (eSIM) or an integrated SIM (iSIM), for example. Further, for example, the user terminal 20 may transmit the connection request when the power of the user terminal 20 is activated (turned on). The connection request may include an ID (identification information) of the user terminal 20. The ID (user ID) may be, for example, a mobile phone number assigned by a telecommunications carrier.

Subsequently, the information processing apparatus 10 transmits (transfers) the connection request to the contract management apparatus 50 via the management apparatus 40 (step S102). Subsequently, the contract management apparatus 50 transmits (returns, responds) the contract information of the user of the user terminal 20 to the information processing apparatus 10 via the management apparatus 40 (step S103). The contract information of the user may include, for example, a user ID and information indicating contents of a service to which the user has a contract (subscription). The contract information of the user may be registered in the contract management apparatus 50 by an operator (a salesclerk) or the like in response to an instruction from the user when the user contracts at an actual store such as a telecommunications carrier. Further, the contract information of the user may be registered in the contract management apparatus 50 from a Web server, for example, when the user makes a new contract (application) or changes the contract content on a Web site of a telecommunications carrier or the like.

Subsequently, the information processing apparatus 10 records information included in the received contract information in contract DB 501 (step S104). In the example of FIG. 5, in the contract DB 501, a priority non-public network name, a priority non-public network cell, a necessity of approval when connecting to a priority non-public network, and a necessity of approval when reconnecting to a public network are recorded in association with the user ID. Note that the contract DB 501 may be recorded in a storage apparatus inside the information processing apparatus 10 or may be recorded in a storage apparatus outside the information processing apparatus 10. Note that the contract DB 501 may be recorded in the user terminal 20. In this case, only a record associated with the user ID of the user terminal 20 in the contract DB 501 may be recorded in the storage apparatus (e.g., eSIM or iSIM) of the user terminal 20.

The priority non-public network name is a name of the non-public network service connecting data communication sessions in preference to the contracted public network. The priority non-public network name may be, for example, Data Network Name (DNN) defined in the Third Generation Partnership Project (3GPP) 5G specification. The priority non-public network name may be, for example, Access Point Name (APN).

The priority non-public network cell is information indicating a cell of a non-public network service that connects a session of data communication in preference to a contracted public network. The priority non-public network cell may be, for example, information indicating a tracking area (TA).

The necessity of approval when connecting to a priority non-public network is information indicating whether or not an approval (confirmation) operation by the user is necessary when the user terminal 20 connects to the non-public network that connects a data communication session in preference to the contracted public network. A necessity of approval when reconnecting to the public network is information indicating whether or not an approval (confirmation) operation by the user is necessary when the user terminal 20 is out of service of the cell 30B1 of the non-public network and connects to the public network again.

<<Processing of Switching from Public Network to Non-Public Network>>

Figure 6:
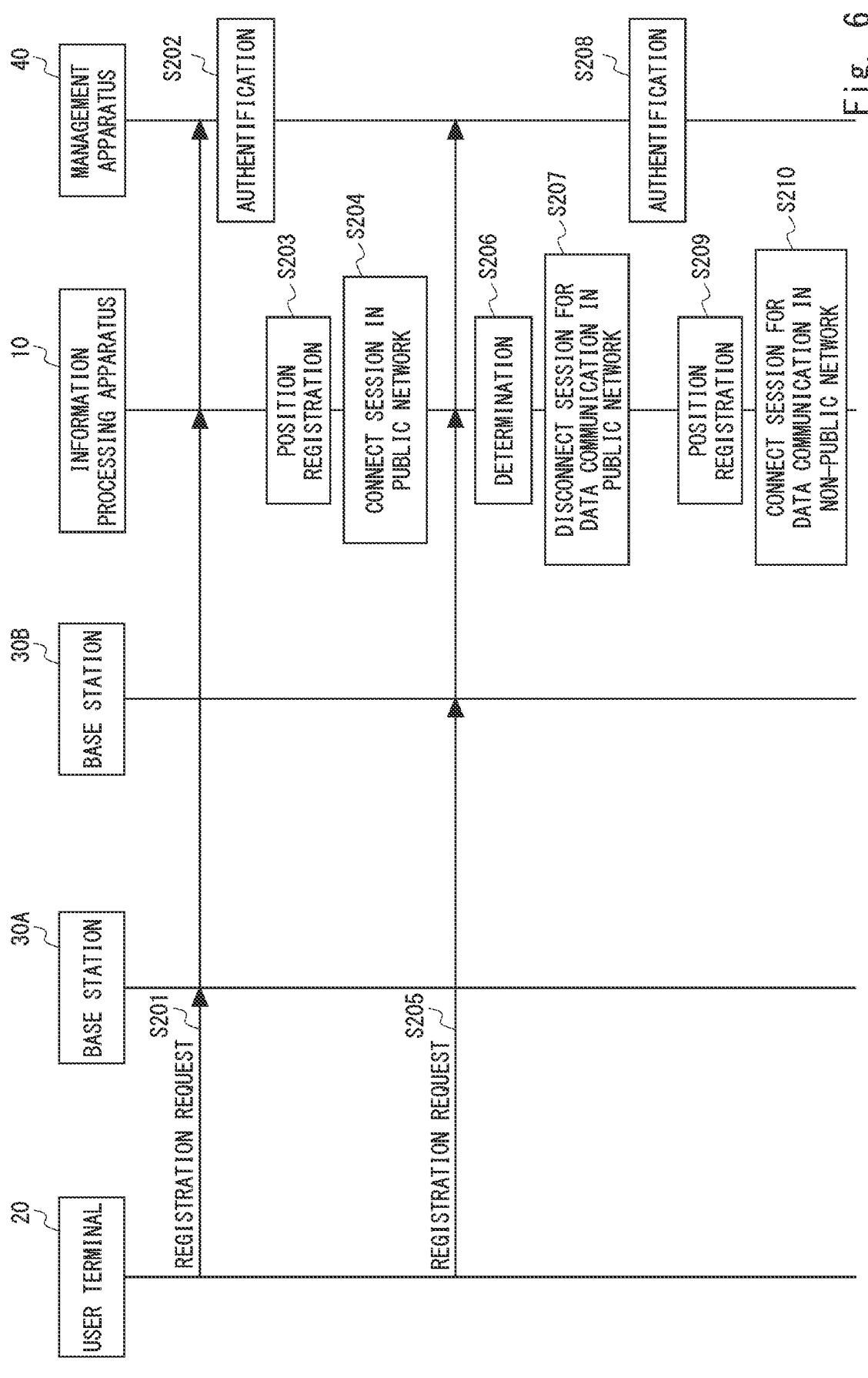
FIG. 6 is a sequence diagram illustrating an example of processing of switching from a public network to a non-public network in the information processing system according to the example embodiment.

Next, an example of processing of switching from the public network to the non-public network of the information processing system 1 according to the example embodiment will be described with reference to FIG. 6. FIG. 6 is a sequence diagram illustrating an example of processing of switching from the public network to the non-public network of the information processing system 1 according to the example embodiment.

In step S201, the user terminal 20 connects radio communication with the base station 30A and transmits Registration Request. Herein, the registration request may include, for example, a user ID of the user terminal 20.

Subsequently, the management apparatus 40 authenticates the user terminal 20 (step S202). Subsequently, when the authentication in the management apparatus 40 is successful, the information processing apparatus 10 performs position registration (attachment) of the user terminal 20 to the base station 30A of the public network (step S203).

Subsequently, the information processing apparatus 10 connects a session for data communication and a session for voice communication in the public network (step S204). Herein, for example, the information processing apparatus 10 may cause a Session Management Function (SMF) node to set up a Protocol Data Unit (PDU) session and assign an Internet Protocol (IP) address to the user terminal 20.

Subsequently, when the user terminal 20 is carried by the user and moves within the coverage of the base station 30B, the user terminal 20 connects wireless communication with the base station 30B and transmits a registration request to the information processing apparatus 10 (step S205). Note that the information included in the registration request or the information received by the user terminal 20 from the base station 30B is an example of "information indicating that the user terminal 20 that is located in the base station 30A of the public network and connected in such a way as to be capable of data communication with the public network is located in the base station 30B of the non-public network".

Herein, the registration request may include at least one of a user ID of the user terminal 20, a name (e.g., DNN) of a non-public network service of the base station 30B, and information indicating a cell (e.g., a tracking area) of the base station 30B. Note that the user terminal 20 may receive the name of the non-public network service of the base station 30B and the information indicating the cell of the base station 30B from the base station 30B.

For example, the user terminal 20 may transmit, as the registration request, a "Registration Request" message in which a "Registration Type" parameter is set to "Mobility Update" in accordance with the provisions of 5G. In addition, the user terminal 20 may transmit, for example, "Tracking Area Update Request" as the registration request.

Subsequently, the information processing apparatus 10 refers to the contract DB 501 and determines whether or not to connect the user terminal 20 to the non-public network of the base station 30B (step S206). Herein, for example, in a case where a combination (record) of the received user ID and at least one of the name of the non-public network service and the cell of the base station 30B is registered in the contract DB 501, the information processing apparatus 10 may determine to connect to the non-public network. In this case, for example, the information processing apparatus 10 may determine whether the priority non-public network name recorded in association with the user ID of the user terminal 20 in the contract DB 501 matches the name of the non-public network service of the base station 30B received from the user terminal 20. Further, for example, the information processing apparatus 10 may determine whether the priority non-public network cell recorded in association with the user ID of the user terminal 20 in the contract DB 501 matches the cell of the base station 30B received from the user terminal 20.

When it is not determined to connect to the non-public network of the base station 30B, the following processing is not executed. Hereinafter, a case where it is determined to connect to the non-public network of the base station 30B will be described.

(Example in which the Necessity of User Approval when Connecting to a Non-Public Network can be Set)

The information processing apparatus 10 may enable the user to set whether or not an approval operation by the user is necessary when switching from the public network to the non-public network. In this case, in step S207, the information processing apparatus 10 may refer to the contract DB 501 and acquire a necessity of approval when connecting to a priority non-public network, which is stored in association with the received user ID. Then, when the necessity of approval when connecting to a priority non-public network is set to "No", the information processing apparatus 10 may automatically execute the following processing in step S207 and subsequent steps (without an approval operation by the user).

On the other hand, when the necessity of approval when connecting to a priority non-public network is set to "necessary", the information processing apparatus 10 may transmit an inquiry to the user terminal 20 as to whether or not switching from the public network to the non-public network is possible. In this case, the inquiry may include information indicating at least one of the name of the non-public network service and the cell of the base station 30B received from the user terminal 20.

Then, the user terminal 20 may display a display window (Graphical User Interface: GUI) including information included in the received inquiry, for example, at the own terminal, and may accept an operation of approval or rejection for switching from the public network to the non-public network from the user. Then, the user terminal 20 may transmit information indicating approval or rejection designated by the user to the information processing apparatus 10. Then, the information processing apparatus 10 may execute the following processing in step S207 and subsequent steps only when being approved by the user.

Subsequently, the information processing apparatus 10 disconnects (opens) a session for data communication in the public network (step S207). Herein, for example, the information processing apparatus 10 may transmit information for disconnecting data communication in the public network to the SMF node while maintaining the connection of the session for voice communication in the public network. The SMF node may then open a PDU session for data communication. As a result, only the data communication using the public network by the user terminal 20 is stopped.

Subsequently, the management apparatus 40 authenticates the user terminal 20 (step S208). Subsequently, the information processing apparatus 10 registers a position of the user terminal 20 with respect to the base station 30B of the non-public network (step S209). Herein, the information processing apparatus 10 may continue to be able to make and receive voice calls in the public network via the base station 30B of the non-public network. Thus, for example, the user terminal 20 can perform data communication in a non-public network and voice call in a public network.

Subsequently, the information processing apparatus 10 connects a session for data communication in a non-public network (step S210). Herein, for example, the information processing apparatus 10 may cause the SMF node to set up a PDU session of a non-public network. Thus, for example, the user terminal 20 can perform data communication using a non-public network such as a local 5G. In this case, the information processing apparatus 10 may provide, for example, a specific network slice logically independent of the public network as a data communication service for the non-public network. Thus, for example, it is possible to provide a non-public network service using the base station 30B provided in a site of a company of a user or the like, such as in a school, a factory, or a company.

<<Processing in which the User Terminal 20 Becomes Out of Service of the Cell of the Non-Public Network and Connects to the Public Network Again>>

Figure 7:
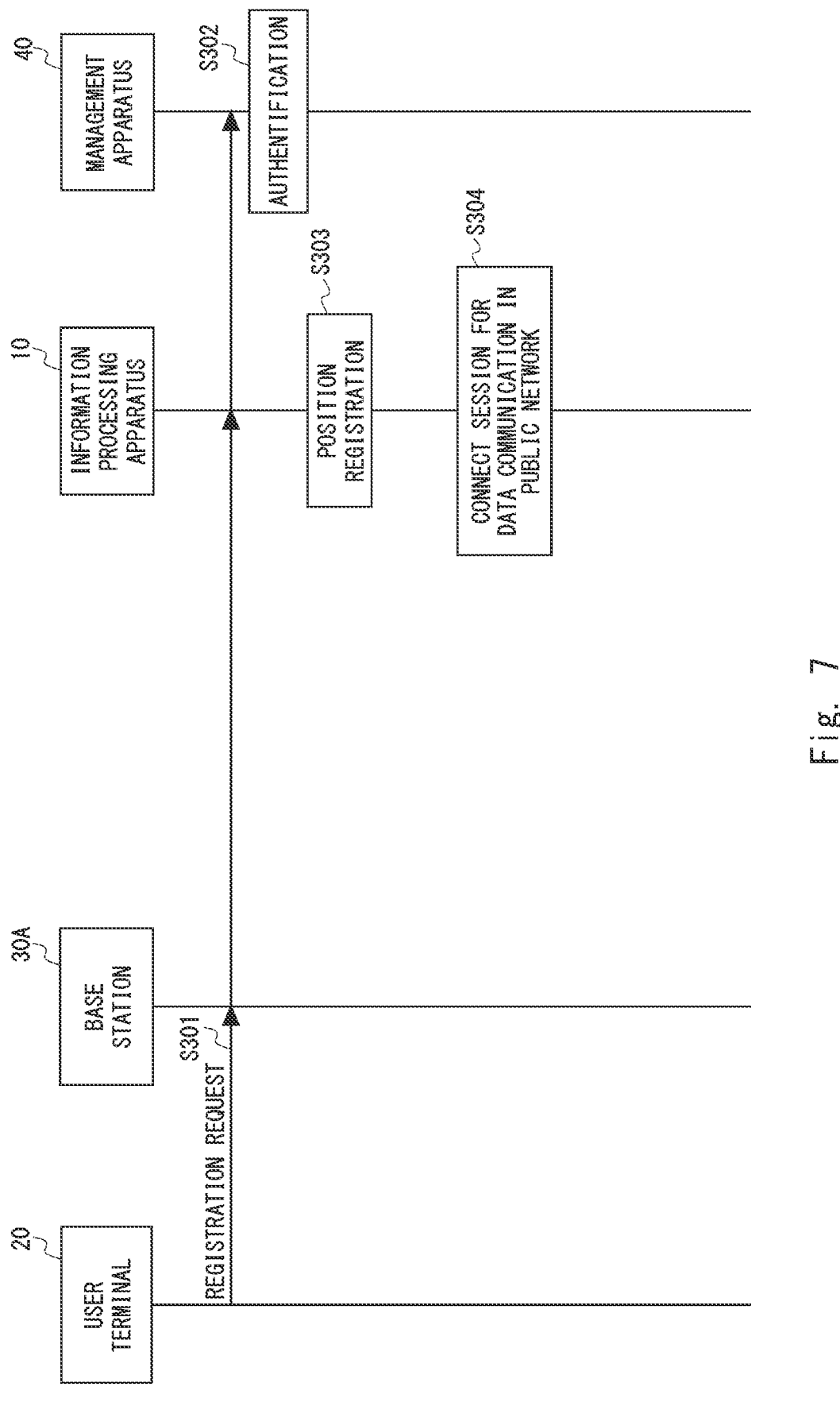
FIG. 7 is a sequence diagram illustrating an example of processing in which a user terminal of the information processing system according to the example embodiment is out of service of a cell of a non-public network and is connected to the public network again.

Next, with reference to FIG. 7, an example of processing in which the user terminal 20 of the information processing system 1 according to the example embodiment becomes out of service of the cell 30B1 of the non-public network and is connected to the public network again will be described. FIG. 7 is a sequence diagram illustrating an example of processing in which the user terminal 20 of the information processing system 1 according to the example embodiment is out of service of the cell 30B1 of the non-public network and is connected to the public network again. Note that the following processing may be executed, for example, when the user terminal 20 is carried by the user and moves out of service (out of coverage) of the cell 30B1 of the base station 30B after the processing of FIG. 6 is executed.

In step S301, the user terminal 20 connects radio communication with the base station 30A and transmits Registration Request. Subsequently, the management apparatus 40 authenticates the user terminal 20 (step S302). The processing in steps S301 and S302 may be the same as the processing in steps S201 and S202 in FIG. 6.

(Example in which it is Possible to Set Whether or not the User Needs to Approve when Connecting to the Public Network Again)

The information processing apparatus 10 may enable the user to set whether or not an approval operation by the user is necessary when the user terminal 20 is out of service of the cell 30B1 of the non-public network and connects to the public network again. In this case, in step S303, the information processing apparatus 10 may refer to the contract DB 501 and acquire a necessity of approval when reconnecting to the public network, which is stored in association with the received user ID. Then, when the necessity of approval when reconnecting to the public network is set to "No", the information processing apparatus 10 may automatically execute the following processing in step S303 and subsequent steps (without an approval operation by the user).

On the other hand, when the necessity of approval when reconnecting to the public network is set to "necessary", the information processing apparatus 10 may transmit an inquiry to the user terminal 20 as to whether or not switching from the non-public network to the public network is possible. In this case, the inquiry may include information indicating at least one of the name of the public network service and the cell of the base station 30A received from the user terminal 20.

Then, the user terminal 20 may display a display window (Graphical User Interface: GUI) including information included in the received inquiry, for example, at the own terminal, and may accept an operation of approval or rejection for the connection to the public network again from the user. Then, the user terminal 20 may transmit information indicating approval or rejection designated by the user to the information processing apparatus 10. Then, the information processing apparatus 10 may execute the following processing in step S303 and subsequent steps only when being approved by the user. Thus, for example, when the user moves out of range of the local 5G while continuing large-capacity data communication, the user can determine not to continue the data communication, for example, in a case where the data communication is free or the like in the local 5G, and the data communication is the pay-per-use or the like in the carrier 5G.

Subsequently, the information processing apparatus 10 registers the position of the user terminal 20 with respect to the base station 30A of the public network (step S303). Subsequently, the information processing apparatus 10 connects a session for data communication in the public network (step S304). The processing in steps S303 and S304 may be the same as the processing in steps S203 and S204 in FIG. 6.

Modified Example 1

The user terminal 20 may be provided with a functional unit that performs processing of at least a part of each functional unit of the information processing apparatus 10. In this case, the user terminal 20 may be configured as the information processing apparatus 10. In this case, in the above description, the information processing apparatus 10 may be replaced with an SMF node or the like, and the user terminal 20 may be replaced with the information processing apparatus 10. In this case, only the record associated with the user ID of the user terminal 20 in the contract DB 501 may be recorded in the storage apparatus (e.g., eSIM or iSIM) of the user terminal 20 that is the information processing apparatus 10. Further, the information processing apparatus 10 may be accommodated in the user terminal 20 and configured as an integrated information processing apparatus. Such an information processing apparatus 10 is also included in an example of "information processing apparatus" of the present disclosure.

Modified Example 2

The information processing apparatus 10 may be an apparatus included in one housing, but the information processing apparatus 10 of the present disclosure is not limited to this. Each unit of the information processing apparatus 10 may be achieved by, for example, cloud computing constituted by one or more computers. In addition, the user terminal 20 may execute at least a part of the processing of each functional unit of the information processing apparatus 10. Such an information processing apparatus 10 is also included in an example of "information processing apparatus" of the present disclosure.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

Some or all of the above-described example embodiments may be described as the following supplementary notes, but are not limited thereto.
(Supplementary Note 1)
  An information processing apparatus including:
  a receiving unit configured to receive information indicating that a user terminal is located in a base station of a non-public network, the user terminal being located in a base station of a public network and connected to the public network in such a way as to be capable of data communication; and
  a control unit configured to control, based on contract information of the user terminal, to disconnect data communication in the public network and transmit information for connecting data communication in the non-public network.
(Supplementary Note 2)
  The information processing apparatus according to Supplementary note 1, wherein
  the non-public network is a local 5G (local 5th-generation mobile communication system) network, and
  the information processing apparatus is an access and mobility management function (AMF) node.
(Supplementary Note 3)
  The information processing apparatus according to Supplementary Note 1 or 2, wherein the contract information includes information indicating at least one of data network name (DNN) and a tracking area of the non-public network that prioritizes connecting data communication over the public network.
(Supplementary Note 4)
  The information processing apparatus according to any one of Supplementary notes 1 to 3, wherein the control unit controls to transmit information for disconnecting data communication in the public network to an apparatus of the public network while maintaining connection of a session of a voice call in the public network.

(Supplementary Note 5)
  The information processing apparatus according to any one of Supplementary notes 1 to 4, wherein the contract information includes information indicating whether an approval operation of a user of the user terminal is necessary when the non-public network that prioritizes connection of data communication over the public network is connected.
(Supplementary Note 6)
  The information processing apparatus according to any one of Supplementary notes 1 to 5, wherein the contract information includes information indicating whether an approval operation of a user of the user terminal is necessary when the user terminal is out of range of a base station of the non-public network and reconnects data communication of the public network.
(Supplementary Note 7)
  An information processing method including:
  receiving information indicating that a user terminal is located in a base station of a non-public network, the user terminal being located in a base station of a public network and connected to the public network in such a way as to be capable of data communication; and
  controlling to disconnect data communication in the public network and transmit information for connecting data communication in the non-public network, based on contract information of the user terminal.
(Supplementary Note 8)
  A program causing a computer to execute processing of:
  receiving information indicating that a user terminal is located in a base station of a non-public network, the user terminal being located in a base station of a public network and connected to the public network in such a way as to be capable of data communication; and
  controlling to disconnect data communication in the public network and transmit information for connecting data communication in the non-public network, based on contract information of the user terminal.
(Supplementary Note 9)
  An information processing system including:
  an information processing apparatus; and a user terminal,
    wherein the information processing apparatus includes:
    a receiving unit configured to receive information indicating that the user terminal is located in a base station of a non-public network, the user terminal being located in a base station of a public network and connected to the public network in such a way as to be capable of data communication; and
    a control unit configured to control, based on contract information of the user terminal, to disconnect data communication in the public network and transmit information for connecting data communication in the non-public network.
(Supplementary Note 10)
  The information processing system according to Supplementary note 9, wherein the non-public network is a local 5G (local fifth-generation mobile communication system) network, and the information processing apparatus is an access and mobility management function (AMF) node.

REFERENCE SIGNS LIST

1 INFORMATION PROCESSING SYSTEM
10 INFORMATION PROCESSING APPARATUS
11 RECEIVING UNIT
12 CONTROL UNIT
20 USER TERMINAL
30A BASE STATION

30B BASE STATION
40 MANAGEMENT APPARATUS
50 CONTRACT MANAGEMENT APPARATUS

What is claimed is:

1. An information processing apparatus comprising:
a memory storing instructions; and
at least one processor configured to execute the instructions to:
receive information indicating that a user terminal is located within a cell of a base station of a non-public network, the user terminal being located within a cell of a base station of a public network and connected to the public network in such a way as to be capable of data communication; and
disconnect, based on contract information of the user terminal, data communication in the public network and transmit information for connecting data communication in the non-public network, wherein
the contract information comprises information indicating whether an approval operation of a user of the user terminal is necessary when the user terminal is out of range of a base station of the non-public network and reconnects data communication of the public network.

2. The information processing apparatus according to claim 1, wherein
the non-public network is a local 5th-generation mobile communication system (5G) network, and
the information processing apparatus is an access and mobility management function (AMF) node.

3. The information processing apparatus according to claim 1, wherein the contract information comprises information indicating at least one of a data network name (DNN) or a tracking area of the non-public network that prioritizes connecting data communication over the public network.

4. The information processing apparatus according to claim 1, wherein the at least one processor is configured to execute the instructions to:
transmit information for disconnecting data communication in the public network to an apparatus of the public network while maintaining a connection of a session of a voice call in the public network.

5. The information processing apparatus according to claim 1, wherein the contract information comprises information indicating whether a second approval operation of the user of the user terminal is necessary when the non-public network that prioritizes connection of data communication over the public network is connected.

6. An information processing method comprising:
receiving information indicating that a user terminal is located within a cell of a base station of a non-public network, the user terminal being located within a cell of a base station of a public network and connected to the public network in such a way as to be capable of data communication; and
disconnecting data communication in the public network and transmit information for connecting data communication in the non-public network, based on contract information of the user terminal, wherein
the contract information comprises information indicating whether an approval operation of a user of the user terminal is necessary when the user terminal is out of range of a base station of the non-public network and reconnects data communication of the public network.

7. A non-transitory computer readable medium storing a program that causes a computer to execute processing of:
receiving information indicating that a user terminal is located within a cell of a base station of a non-public network, the user terminal being located within a cell of a base station of a public network and connected to the public network in such a way as to be capable of data communication; and
disconnecting data communication in the public network and transmit information for connecting data communication in the non-public network, based on contract information of the user terminal, wherein
the contract information comprises information indicating whether an approval operation of a user of the user terminal is necessary when the user terminal is out of range of a base station of the non-public network and reconnects data communication of the public network.

* * * * *